US012591424B2

(12) United States Patent
Ji et al.

(10) Patent No.: US 12,591,424 B2
(45) Date of Patent: Mar. 31, 2026

(54) MANAGING APPLICATION UPDATES

(71) Applicant: Google LLC, Mountain View, CA (US)

(72) Inventors: Haifeng Ji, Mountain View, CA (US);
Giang Huong Le, Norwalk, CA (US);
Luis Silva Vargas, San Jose, CA (US);
Alexey Semenov, San Jose, CA (US)

(73) Assignee: Google LLC, Mountain View, CA (US)

( * ) Notice: Subject to any disclaimer, the term of this
patent is extended or adjusted under 35
U.S.C. 154(b) by 222 days.

(21) Appl. No.: 18/573,400

(22) PCT Filed: Feb. 7, 2023

(86) PCT No.: PCT/US2023/062154
§ 371 (c)(1),
(2) Date: Dec. 21, 2023

(87) PCT Pub. No.: WO2024/167526
PCT Pub. Date: Aug. 15, 2024

(65) Prior Publication Data
US 2025/0094156 A1 Mar. 20, 2025

(51) Int. Cl.
*G06F 8/65* (2018.01)

(52) U.S. Cl.
CPC ...................................... *G06F 8/65* (2013.01)

(58) Field of Classification Search
CPC ............... G06F 8/61; G06F 8/65; G06F 8/658
See application file for complete search history.

(56) References Cited

U.S. PATENT DOCUMENTS

| | | | |
|---|---|---|---|
| 11,762,649 B2 * | 9/2023 | Liao ......................... | G06F 9/542 |
| | | | 717/168 |
| 2009/0132400 A1 * | 5/2009 | Conway ................. | G06Q 30/04 |
| | | | 705/34 |

(Continued)

FOREIGN PATENT DOCUMENTS

| | | |
|---|---|---|
| CN | 107480165 A | 12/2017 |
| CN | 111638892 A | 9/2020 |
| WO | 2022108628 A1 | 5/2022 |

OTHER PUBLICATIONS

Office Action from U.S. Appl. No. 18/043,634 dated Nov. 15, 2024,
39 pp.

(Continued)

*Primary Examiner* — Marina Lee
(74) *Attorney, Agent, or Firm* — Shumaker & Sieffert,
P.A.

(57) ABSTRACT

A process according to the techniques described herein
includes determining a set of available application updates
for one or more applications installed at a computing device,
and determining, based at least in part on an amount of
metered data available during a time period and an amount
of metered data used during the time period, an application
update data budget for downloading application updates
over a metered data network. lire process may also include
determining a respective amount of data required to down-
load each available application update from the set of
available application updates, and scheduling, based the
respective amounts of data required to download each
available application update, a first set of application
updates to be downloaded using the metered data, network
or an unmetered data, network and a second set of applica-
tion updates to be downloaded using only the unmetered
data network.

18 Claims, 4 Drawing Sheets

(56) References Cited

U.S. PATENT DOCUMENTS

| | | | |
|---|---|---|---|
| 2014/0052542 A1* | 2/2014 | Zhang | G06Q 30/0269 |
| | | | 705/14.66 |
| 2014/0156467 A1* | 6/2014 | Typaldos | G06Q 30/0635 |
| | | | 705/26.81 |
| 2014/0366041 A1 | 12/2014 | Stanley-Marbell et al. | |
| 2016/0266890 A1 | 9/2016 | Aleksandrov et al. | |
| 2017/0010883 A1 | 1/2017 | Alsina et al. | |
| 2018/0302494 A1 | 10/2018 | Jain et al. | |
| 2019/0303118 A1 | 10/2019 | Avinash et al. | |
| 2020/0019393 A1 | 1/2020 | Vichare et al. | |
| 2020/0117443 A1 | 4/2020 | Nandakumar et al. | |
| 2020/0371774 A1 | 11/2020 | Kato et al. | |
| 2022/0391187 A1 | 12/2022 | Brooks et al. | |
| 2023/0273783 A1* | 8/2023 | Molander | G06F 8/61 |
| | | | 717/168 |
| 2023/0376297 A1* | 11/2023 | Ji | G06F 8/65 |

OTHER PUBLICATIONS

Response to Extended Search Report dated Mar. 6, 2024, from counterpart European Application No. 23217358.3 filed Jan. 28, 2025, 34 pp.

Response to Office Action dated Nov. 15, 2024 from U.S. Appl. No. 18/043,634, filed Jan. 23, 2025, 18 pp.

Extended Search Report from counterpart European Application No. 23217358.3 dated Mar. 6, 2024, 7 pp.

Glick, "Modern app and game distribution on Google Play", Android Developers Blog, Nov. 7, 2019, p. 4.

International Preliminary Report on Patentability from International Application No. PCT/US2021/041434 dated Jun. 1, 2023, 13 pp.

International Search Report and Written Opinion of International Application No. PCT/US2021/041434 dated Dec. 21, 2021, 18 pp.

International Search Report and Written Opinion of International Application No. PCT/US2023/062154 dated Aug. 10, 2023, 11 pp.

Invitation to Pay Additional Fees and, Where Applicable, Protest Fee from International Application No. PCT/US2021/041434, dated Oct. 28, 2021, 10 pp.

Preliminary Amendment filed Mar. 1, 2023 for U.S. Appl. No. 18/043,634, 9 pp.

Rahman et al., "Internet data budget allocation policies for diverse smartphone applications", retrieved from: https://jwcn-eurasipjournals. springeropen.com/a rticles/10.1186/s13638-016-0727-9, Sep. 22, 2016, 44 pp.

Sn24team, "Google Play Store latest update allow automatic updates over limited mobile data", retrieved from: https://www.samnews24. com/2022/11/14/google-play-store-update-november-14-2022/, Nov. 14, 2022, 5 pp.

Vartianinen et al., "Auto-update: A concept for automatic down-loading of web content to a mobile device", Sep. 2007, 8 pp.

Final Office Action from U.S. Appl. No. 18/043,634 dated Apr. 21, 2025, 45 pp.

* cited by examiner

COMPUTING DEVICE 100

COMPUTING SYSTEM 110

300
REQUEST APP UPDATES

302
DETERMINE AVAILABLE APP UPDATES

304
DETERMINE SIZES OF EACH AVAILABLE APP UPDATE

306
DETERMINE AMOUNT OF DATA AVAILABLE FOR UPDATE DOWNLOAD

308
DETERMINE UPDATE SCHEDULE

312
SCHEDULE UPDATES

310
SEND UPDATE SCHEDULE

314
INSTALL UPDATES BASED ON SCHEDULE

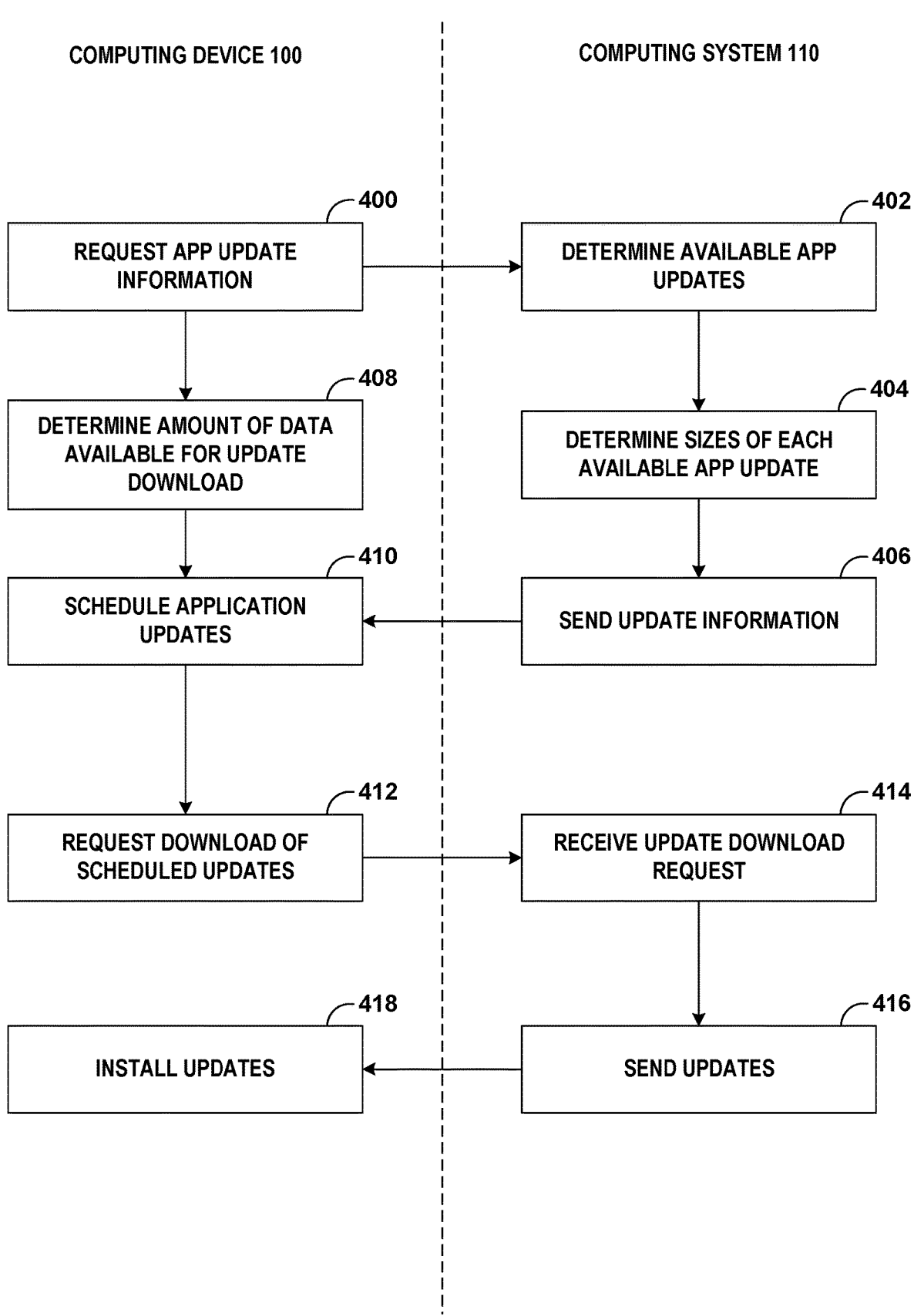

COMPUTING DEVICE 100

COMPUTING SYSTEM 110

400
REQUEST APP UPDATE
INFORMATION

402
DETERMINE AVAILABLE APP
UPDATES

408
DETERMINE AMOUNT OF DATA
AVAILABLE FOR UPDATE
DOWNLOAD

404
DETERMINE SIZES OF EACH
AVAILABLE APP UPDATE

410
SCHEDULE APPLICATION
UPDATES

406
SEND UPDATE INFORMATION

412
REQUEST DOWNLOAD OF
SCHEDULED UPDATES

414
RECEIVE UPDATE DOWNLOAD
REQUEST

418
INSTALL UPDATES

416
SEND UPDATES

FIG. 4

MANAGING APPLICATION UPDATES

This application is a national stage application under 35 U.S.C. § 371 of PCT Application No. PCT/US2023/062154, filed Feb. 7, 2023, the entire contents of which is incorporated herein by reference.

BACKGROUND

Computing devices such as the mobile phone have proliferated in recent years. These devices may be equipped with processors, memory, and the capability to communicate through local and wide area networks, including the Internet. These devices may be equipped with operating systems which permit the devices to execute a wide range of computer programs and software applications, typically called "apps." The user of a computing device may download and install applications by direct communication with a computing system (e.g., a server hosting an application store) through a mobile data network or wireless local area network. Developers of these applications regularly update the applications and push the updated version of the application to the computing system to make the updated version of the application available for installation by the computing devices.

SUMMARY

Techniques are described by which a computing system and computing device may operate to prioritize the installation of updates for a set of applications installed on the computing device when the computing device is connected to a data-limited network connection, such as a mobile data network. In general, users of the computing devices may manage application updates by manually downloading the application updates or electing to have the application updates automatically pushed to the computing devices as soon as the application updates become available ("auto-updates"). While auto-updates facilitate installation of application updates without user interaction from the user, auto-updates that treat all applications equally in terms of update prioritization may, for various reasons, result in applications that are not relatively important to the user being updated (e.g., a successful installation) and applications that are relatively important not being updated (e.g., an unsuccessful installation). Further, auto-update policies may limit downloading and installation of updates to occur only when the device is connected to certain types of networks or may limit the size of updates that may be installed on metered networks, such as mobile data networks.

Rather than simply preventing updates over a specific size from downloading over a metered network connection, such as a mobile data network, techniques of this disclosure enable the computing device to determine an amount of available data and identify application updates to download over the metered network connection based on one or more of application update size, historical data usage for the user, market data usage for the user's market, application update sizes, application update types, application update history for the user, application categories, amount of available data remaining in a time window for the user's device, a daily application update data budget, and a monthly application update data budget. In general, a computing device and/or a cloud computing system may apply a machine learning model to one or more of these factors to determine the application updates to be installed.

In this way, various aspects of the techniques may enable the computing device to identify application updates that are less likely to cause the user to incur excess data usage fees and that are of greater impact to the user (e.g., updates the increase security of the device, provide updates to applications more frequently used by the user, etc.). By managing updates over metered connections in accordance with techniques of this disclosure, it is more likely that application updates are installed in a timely manner while reducing the impact on data caps and excess data usage fees incurred by downloading the application updates over the metered connection. Moreover, downloading and installing application updates over a metered connection in accordance with the techniques of this disclosure may aid in reducing crashes, security issues, or other bugs in such applications, thereby improving the operation of the computing device.

In some examples, a method includes determining, by a computing system, a set of available application updates for one or more applications installed at a computing device, determining, based at least in part on an amount of metered data available during a time period and an amount of metered data used during the time period, an application update data budget for downloading application updates over a metered data network, and determining a respective amount of data required to download each available application update from the set of available application updates. The method may also include scheduling, based the respective amounts of data required to download each available application update, a first set of application updates to be downloaded using the metered data network or an unmetered data network and a second set of application updates to be downloaded using only the unmetered data network, and, responsive to determining that the computing device is connected to the metered data network, initiating download of the first set of application updates.

In some examples, a computing system includes a memory and one or more processors. The one or more processors may be configured to determine a set of available application updates for one or more applications installed at a computing device, determine, based at least in part on an amount of metered data available during a time period and an amount of metered data used during the time period, an application update data budget for downloading application updates over a metered data network, and determine a respective amount of data required to download each available application update from the set of available application updates. The one or more processors may also be configured to schedule, based the respective amounts of data required to download each available application update, a first set of application updates to be downloaded using the metered data network or an unmetered data network and a second set of application updates to be downloaded using only the unmetered data network, and, responsive to determining that the computing device is connected to the metered data network: send, to the computing device, the first set of application updates.

In some examples, a non-transitory computer-readable storage medium encoded with instructions that, when executed by one or more processors of a computing system, cause the one or more processors to determine a set of available application updates for one or more applications installed at a computing device, determine, based at least in part on an amount of metered data available during a time period and an amount of metered data used during the time period, an application update data budget for downloading application updates over a metered data network, and determine a respective amount of data required to download each available application update from the set of available application updates. The one or more processors may also be configured to schedule, based the respective amounts of data required to download each available application update, a first set of application updates to be downloaded using the metered data network or an unmetered data network and a second set of application updates to be downloaded using only the unmetered data network, and, responsive to determining that the computing device is connected to the metered data network: send, to the computing device, the first set of application updates.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 4 is a flowchart illustrating another exemplary operation of the computing system and computing device in accordance with techniques of this disclosure.

DETAILED DESCRIPTION

Figure 1:
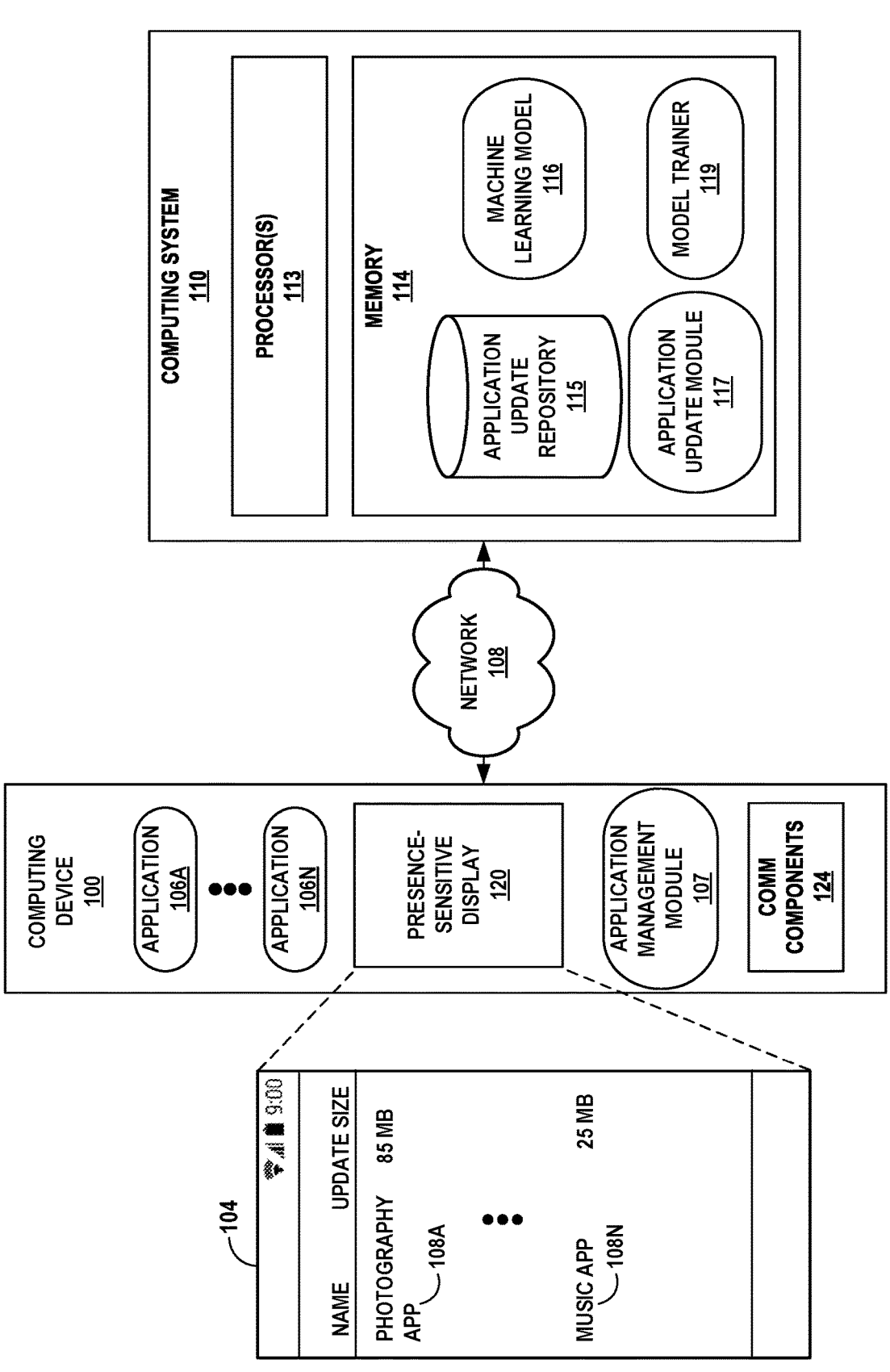
FIG. 1 is a conceptual diagram illustrating an example computing system and computing device for managing application updates in accordance with techniques of this disclosure.

FIG. 1 is a conceptual diagram illustrating an example computing system and computing device for managing application updates in accordance with techniques of this disclosure. As shown in the example of FIG. 1, a computing device 100 and a computing system 110 may facilitate management of application updates by identifying one or more application updates to install in accordance with one or more techniques of this disclosure.

In the example of FIG. 1, computing device 100 is a mobile computing device. However, computing device 100 may be any mobile or non-mobile computing device, such as a cellular phone, a smartphone, a desktop computer, a laptop computer, a tablet computer, a portable gaming device, a portable media player, an e-book reader, a watch (including a so-called smartwatch), an add-on device (such as a casting device), smart glasses, a gaming controller, or another type of computing device.

Similarly, computing system 110 may be any suitable remote computing system, such as one or more desktop computers, laptop computers, mainframes, servers, cloud computing systems, virtual machines, etc. capable of sending and receiving information via network 108. In some examples, computing system 110 may represent a cloud computing system that provides one or more services via network 108. That is, in some examples, computing system 110 may be a distributed computing system. One or more computing devices, such as computing device 100, may access the services provided by the cloud by communicating with computing system 110. While described herein as being performed at least in part by computing system 110, any or all techniques of the present disclosure may be performed by one or more other devices, such as computing device 100.

That is, in some examples, computing device 100 may be operable to perform one or more techniques of the present disclosure alone.

Computing device 100 may include applications 106A-106N (collectively "applications 106), application management module 107, presence-sensitive display 120, and communication ("COMM") components 124. Display 120 may be a presence-sensitive display that functions as an input device and as an output device. For example, the presence-sensitive display may function as an input device using a presence-sensitive input component, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. The presence-sensitive display may function as an output (e.g., display) device using any of one or more display components, such as a liquid crystal display (LCD), dot matrix display, light emitting diode (LED) display, microLED display, organic light-emitting diode (OLED) display, e-ink, active matrix organic light-emitting diode (AMOLED) display, or similar monochrome or color display capable of outputting visible information to a user of computing device 100.

COMM components 124 may receive and transmit various types of information, such as information concerning pending updates associated with one or more applications 106 installed on computing device 100, over network 108. Network 108 may include a wide-area network such as the Internet, a local-area network (LAN), a personal area network (PAN) (e.g., Bluetooth®), an enterprise network, a wireless network, a cellular network, a telephony network, a Metropolitan area network (e.g., WIFI, WAN, WIMAX, etc.), one or more other types of networks, or a combination of two or more different types of networks (e.g., a combination of a cellular network and the Internet).

COMM components 124 may include wireless communication devices capable of transmitting and/or receiving communication signals using network 108, such as a cellular radio, a 3G radio, a 4G radio, a 5G radio, a Bluetooth® radio (or any other PAN radio), an NFC radio, or a WIFI radio (or any other WLAN radio). Additionally or alternatively, COMM components 124 may include wired communication devices capable of transmitting and/or receiving communication signals via a direct link over a wired communication medium (e.g., a universal serial bus ("USB") cable).

Computing device 100 may download, install, and execute one or more applications 106 (e.g., using one or more of COMM components 124) Applications 106 may represent first party applications developed and provided as an application integrated into an operating system or third-party applications that a user of computing device 100 obtains via application store services provided by way of the operating system, computing system 110, or another computing system. Application 106 may extend software functionality of computing device 100, where application 106 may execute within an execution environment presented by the operating system. Application 106 may, as a few examples, provide gaming services (e.g., video games), email services, web browsing services, texting and/or chat services, web conferencing services, video conferencing services, music services (including streaming music services), video services (including video streaming services), navigation services, word processing services, spreadsheet services, slide and/or presentation services, assistant services, text entry services, or any other service commonly provided by applications.

According to techniques of this disclosure, computing device 100 may execute application management module 107 to facilitate management of application updates by operating in conjunction with an application update module 117 of computing system 110 to intelligently prioritize application updates over metered data networks. For example, computing device 100 may use application management module 107 to generate application management information for identifying applications 106 installed on computing device 100. In various instances, application management module 107 may be a client application associated with an application repository or store managed and/or provided by computing system 110. That is, computing device 100 may execute application management module 107 to present an online application store graphical user interface (e.g., GUI 104) via presence-sensitive display 120 for an online application store. The application store may be hosted or otherwise provided by computing system 110 and the application store may enable a user of computing device 100 to browse, search, select, purchase, download, and install various applications and application updates on computing device 100.

From time-to-time developers of various applications may add new features, fix various bugs, fix various security issues, or otherwise update the software code for an application. The developer may publish the application update (e.g., for application 106A) to the online application store provided by computing system 110. When computing device 100 checks for any available updates for applications 106, computing system 110 may identify the published application update for application 106A as being a new update available for application 106A.

Computing device 100 may automatically send, using one or more COMM components 124, a request for application update information to computing system 110 (e.g., at a predefined schedule, based on application usage history, etc.) or may send such an application update information request in response to receiving a user input. The request for application update information may include information identifying computing device 100, information about one or more of applications 106, device storage information, user settings (e.g., auto-update settings) for application updates, and other configuration information for computing device 100. The information about applications 106 may include information such as a name or other text-based identifier, version information for the installed applications, historical application usage information for each installed application, results of previous application update attempts for the installed applications, etc.

As one example, application 106A installed on computing device 100 may be a photography application, and application 106N may be a music application. In such an example, application management module 107 may generate an application update request for photography application 106A and music application 106N. Application management module 107 may then send the application update request to computing system 110.

While examples are described where a computing device and/or a computing system analyzes information (e.g., application usage, device usage, installation histories, etc.) associated with a computing device and a user of a computing device, the computing device and/or computing system may analyze the information only if the computing device receives permission from the user of the computing device to analyze the information. For example, in situations discussed below, before a computing device or computing system may collect or may make use of information associated with a user, the user may be provided with an opportunity to provide input to control whether programs or features of the computing device and/or computing system may collect and make use of user information (e.g., information about a user's current location, current speed, etc.), or to dictate whether and/or how to the device and/or system may receive content that may be relevant to the user. In addition, certain data may be treated in one or more ways before it is stored or used by the computing device and/or computing system, so that personally identifiable information is removed. Thus, the user may have control over how information is collected about the user and used by the computing device and computing system.

Computing system 110 may determine a set of applications installed on computing device 100 that need to be updated based on the request for application update information. For example, computing system 110 may determine, based on the listing of applications and the respective version information for each installed application, that application 106A (e.g., a photography application) and application 106N (e.g., a music application) may each have a pending application update available (e.g., on the application store).

As shown in FIG. 1, computing system 110 includes one or more processors 113 and memory 114. Processors 113 may implement functionality and/or execute instructions associated with computing system 110. Examples of processors 113 include application processors, display controllers, auxiliary processors, one or more sensor hubs, and any other hardware configured to function as a processor, a processing unit, or a processing device. Machine learning model 116, application update module 117, model trainer 119, and the like may be operable (or, in other words, executed) by processors 113 to perform various actions, operations, or functions of computing system 110. That is, modules 116-119 may form executable bytecode, which when executed, cause processors 113 to perform specific operations in accordance with (e.g., causing computing system 110 to become a specific-purpose computer by which to perform) various aspects of the techniques described herein.

Computing system 110 may further include memory 114. Memory 114 may store application update repository 115, machine learning model 116, application update module 117, and model trainer 119. Memory 114 may, in some examples, be described as a computer-readable storage medium. In some examples, memory 114 is a temporary memory, meaning that a primary purpose of memory 114 is not long-term storage. Memory 114 may also be described as a volatile memory, meaning that memory 114 does not maintain stored contents when computing system 110 is turned off. Examples of volatile memories include random access memories (RAM), dynamic random-access memories (DRAM), static random-access memories (SRAM), and other forms of volatile memories known in the art. In some examples, memory 114 may be used to store program instructions for execution by processors 113. Memory 114 may be used by software or applications running on computing system 110 (e.g., software required to analyze applications available through an online application store) to temporarily store information during program execution.

Responsive to receiving the request for application update information, application update module 117 may determine a set of applications from applications 106 that have outstanding updates (i.e., updates that have not yet been successfully installed on computing device 100). For example, application update module 117 may perform a lookup in application update repository 115 to determine which, if any, of applications identified in the application update information have outstanding updates. As one example, the application update information includes an indication that photography application 106A, music application 106N, and a social network application are installed on computing device 100. Application update module 117 may execute a query to retrieve current version information for one or more of these applications. Application update module may compare the retrieved current version information to the currently installed version of photography application 106A, music application 106N, and the social network application. Based on the version information comparison, application update module 117 may determine that one or more of applications 106 have outstanding updates.

Application updates may be various sizes (e.g., 5 MB, 20 MB, 400 MB, etc.) and computing device 100 may be configured to limit the size of application updates to install while computing device 100 is connected to a metered data network (e.g., a mobile data network) rather than an unmetered data network (e.g., WIFI, Ethernet, etc.). In some geographic areas, unmetered data networks are uncommon such that various computing devices may only connect to metered data networks or may rarely connect to unmetered data networks. Prohibiting application update downloads greater than a certain size over metered data connections may result in various applications rarely or never being updated, which may result in a less secure device.

Rather than simply prohibiting application updates over a certain size from being downloaded, techniques of this disclosure enable a computing device to intelligently determine which updates may be downloaded, regardless of the size of the updates, while reducing or minimizing the costs incurred by data overage fees on metered data networks. Computing device 100 may include a user configurable setting that enables/disables such intelligent application updates over a metered data network.

In various instances, a user of computing device 100 may subscribe to a data plan that allocates a defined amount of data (i.e., a data allowance) the user may send and/or receive from one or more devices associated with the user using a metered data network over a specified period of time (e.g., 30 days, one week, one month, three months, one year, etc.). The specified period of time may be referred to herein as the billing period. The data plan may further specify a per megabyte, gigabyte, etc. cost for any data usage over the allocated amount. To facilitate installation of application updates over the metered data network, the user may optionally choose to provide computing system 110 information about the user's data allowance and may give permission for computing system 110 to retrieve information about the amount of data used by the user under the data plan. Absent the user's explicit consent, computing system 110 may not access any of the user's data allowance or data usage information. The user may also optionally choose to allow computing system 110 to include the user's data usage information in aggregated data usage information for various geographic regions, business markets, demographics, etc. Such aggregated data usage information may not include any information identifying the user or otherwise connecting the user's identity to the user's data usage information.

Computing system 110 may determine whether computing device 100 is eligible to have application updates managed according to the techniques of this disclosure. For example, if the user of computing device 100 does not explicitly consent and configure computing device 100 to provide data plan or other information to computing system 110, computing system 110 manages application updates for applications 106 according to conventional techniques in the art. In examples where the user does explicitly consent to providing one or more of historical data usage information and data allowance information to computing system 110, computing system 110 may analyze the historical data usage information and/or data allowance information to determine whether computing device 100 is eligible for data usage-based application update management. For example, if the user has a data allowance of 2 GB or greater, application update module 117 determines that the user is eligible for data usage-based application update management. However, if the user has a data allowance of less than 2 GB, application update module 117 determines that computing device 100 is not eligible for data usage-based application update management and, instead, uses conventional application update techniques. While this example uses 2 GB as an example threshold, the data allowance for the threshold may be any amount of data, such as 500 MB, 1 GB, 5 GB, 10 GB, etc.

As another example, if the user had a data allowance of 2 GB and uses 1.8 GB of data in a typical billing cycle (as determined using the historical data usage information), application update module 117 may determine that the 200 MB of unused data is insufficient and, thus, computing device 100 is not eligible for data usage-based application update management. However, if the user uses 1 GB of data in a typical billing cycle, application update module 117 may determine that 1 GB of unused data is sufficient and, thus, computing device 100 is eligible for data usage-based application update management Again, while this example illustrates 200 MB of unused data being in sufficient and 1 GB of unused data being sufficient, any amount of data may be used as a threshold amount of data to determine if computing device 100 is eligible for data usage-based application update management as described herein. Example thresholds include, but are not limited to, 50 MB, 100 MB, 200 MB, 500 MB, 1 GB, 2 GB, 5 GB, etc.

In instances where computing system 110 determines that computing device 100 is eligible for data usage-based application update management, computing device 100 and/or computing system 110 may analyze the user's data usage over various periods of times or sliding windows as well as an amount of data remaining in the user's data allowance for the current billing period to determine how much data may be available to use for downloading application updates. For example, application update module 107 of computing device 100 may determine the total device data usage over the last 30 days (e.g., where the duration of the sliding window is 30 days where the sliding window cover the immediately prior 30-day period) and well as the manual update data usage over the last 30 days. Manual update data usage is the amount of data used to update applications 106 in response to the user of computing device 100 manually choosing to download and install updates for one or more applications 106, whether over a metered or unmetered data network. In some instances, rather than determining the manual update data usage for the user of computing device 100, computing system 110 may determine a median manual update data usage for a particular country, geographic region, market, or other area. In some examples, machine learning model 116 takes one or more of the various data usage and data allowance information discussed above as inputs and produces the sliding window and/or daily data budgets as outputs.

As one example, the user may have a 7-day data usage allowance of 100 MB, wherein the user has already used 5 MB of data such that there is 95 MB of data remaining. Application management module 107 may send a request for application update information to computing system 110 using communication components 124 and network 108. Computing system 110 may, using application update module 117, determine that there are updates for photography application 106A and music application 106N that are 85 MB and 25 MB in size, respectively (as shown by elements 108A and 108N in GUI 104). As there is only 95 MB remaining in the data usage allowance, computing device 100 cannot download and install both updates without exceeding the data usage allowance. In a simple example, application update module 117 may select the oldest outstanding update to install, may select an application update that includes security updates over application updates that do not include security updates, may select an application update for an application that is most frequently used by the user, etc. However, in various instances, application update module 117 may also use machine learning model 116 to determine which update to install. That is, machine learning model 116 may include two or more machine learning models where one machine learning model may generate data budgets as output and another machine learning model may generate application update priority scores as output. Thus, while described as using machine learning model 116 as producing both the data budgets and priority scores, the techniques of this disclosure do not require a single machine learning model to be trained to produce both the data budgets and priority scores as outputs.

Machine learning model 116 may take a variety of signals as inputs and provide a score for each application update indicative of the update priority for the corresponding application update. For example, application update module 117 may provide, as inputs to machine learning model 116, one or more of application update size, historical data usage for the user, market data usage for the user's market, application update sizes, application update types, application update history for the user, application categories, age of each application update, amount of available data remaining in a sliding window for the user's device, a daily application update data budget, and a monthly application update data budget, cost of data in excess of the data allowance, and geographic region where computing device 100 is physically located, as non-limiting examples. Machine learning model 116 processes the inputs and may generate an update priority score for applications having pending updates (e.g., photography application 106A and music application 106N).

As one example, machine learning model 116 generated an update priority score for photography application 106A of 70 and an update priority score for music application 106N of 85. The magnitude of the update priority score may be indicative of the priority of the application update. Thus, an update priority score of 85 may indicate that the application update for music application 106N is of higher priority than photography application 106A. While FIG. 1 includes GUI 104, in various examples, computing device 100 may not output a GUI that includes the update priority scores for one or more of applications 106. Instead, computing device 100 may simply process the application updated based, at least in part, on the update priority scores without outputting GUI 104 at all or may output a list of outstanding application updates based, at least in part, on the update priority scores, as non-limiting examples.

Computing system 110 may send an indication of the update priority scores or the priority scores themselves to computing device 100. Responsive to receiving the indication of the priority scores, application management module 107 may determine, based on the indication of the update priority scores, an order in which to request application updates such that application updates do not exceed the allocated data budget for the day, sliding window, and/or remaining data for the current billing period. For example, the order of the application updates may indicate that computing device 100 should send an update request for application 106N first because application 106N has the largest update priority score. The order of the application updates may further indicate that an update request for application 106A is second because application 106A has the second-largest update priority score.

Computing device 100 may generate an update request for one or more of the set of applications having pending updates. For example, computing device may generate an update request for music application 106N because music application 106N has a larger update priority score (e.g., 85) than photography application 106A (e.g., 70), indicating that installing the update to music application 106N is of higher priority than installing the update to photography application 106A. The update request may identify the applications to be updated, permission settings (e.g., network preference), and the like.

Computing device 100 may send the update request to computing system 110. In response to receiving the update request, application update module 117 may initiate installation of the at least one application update at computing device 100 and update the data usage information for computing device 100 and/or the user of computing device 100. For example, application update module 117 may send, via network 108, an application update install package for music application 106N to computing device 100 and update the available data to reflect the 25 MB used to download the application update install package for music application 106N. That is, after computing device 100 downloads the application update install package for music application 106N, rather than having 95 MB remaining in the data allowance as was the case prior to the download, there is now 70 MB remaining in the data allowance. Because the update for photography application 106A is greater than 70 MB, computing system 110 does not send the application update install package for photography application 106A to computing device 100. In general, in response to receiving the application update install package(s), application management module 107 may initiate installation of at least one of the application update install packages.

If computing device 100 connects to an unmetered data network prior to the application update install package for photography application 106A being downloaded and installed using a metered data network, computing device 100 may automatically request the application update install package for photography application 106A from computing system 110. In the application update request, computing device 100 may include an indication that computing device 100 is connected to an unmetered data connection. Computing system 110 may determine, based on the application update request, that computing device 100 is connected using an unmetered data network and forgo determining the amount of data available to download and application updates and, instead, send any application updates requested by computing device 100.

At a later time, after computing device 100 has downloaded and installed the application update for music application 106N, computing device 100 may send another request for application updates. Application update module

117 of computing system 110 may determine an updated amount of data available for downloading application updates. If the request is sent 6 days after computing device 100 downloaded the application update install package for music application 106N, application update module 117 determines that the amount of data available in the 7-day sliding window is 100 MB less the 25 MB of data used to update music application 106N and, if the 5 MB of data that was previously used in the example above is still within the 7-day sliding window, less that 5 MB of data. Thus, application update module 117 determines that there is 75 MB (or 70 MB) of available data to use for application updates. As the application update install package for photography application 106A is 85 MB, application update module 117 does not send the application update install package to computing device 100.

In an example where computing device 100 requests application updates 8 days after downloading the application update install package for music application 106N, application update module 117 determines an amount of data available for application updates without subtracting the data used to download the application update install package for music application 106N because that data usage occurred outside of the sliding window. In such an example and assuming no other data usage in the current 7-day window, application update module 117 determines that there is 100 MB of data available for application updates and sends the application install update package for photography application 106A to computing device 100.

Rather than strictly downloading application updates based on the amount of data available in the sliding window, computing system 110 may selectively send application updates to computing device 100 that use more data than is available in the sliding window. In such instances, application management module 117 may determine an amount of time remaining in a billing cycle, an amount of data remaining for the billing cycle, and, optionally, a predicted amount of data the user is likely to use during the time remaining in the billing cycle. For example, if there are fewer than a threshold number of days remaining in the billing cycle (e.g., 5 days, 3 days, 1 day, etc.), there is 50 MB of data remaining for application updates in the 7-day sliding window, there is 200 MB of data remaining for the billing cycle, and the user is predicted to use 75 MB of data over the 3 days remaining in the billing cycle, application management module 117 may determine that there is 125 MB of data available for application updates. In such an example, rather than selecting between the application updates for photography application 106A (85 MB) and music application 106N (25 MB), application management module 117 may send the application update install packages for both photography application 106A and music application 106N to computing device 100 even though the updates would use 110 MB of data, which exceeds the amount of data remaining for application updates in the sliding window.

Computing system 110 may further include model trainer 119. Model trainer 119 may train machine learning model 116 to improve the effectiveness of machine learning model 116. Model trainer 119 may train machine learning model 116 in an offline fashion or an online fashion. In offline training (also known as batch learning), machine learning model 116 may be trained on the entirety of a static set of training data. In online learning, machine learning model 116 may be continuously trained (or re-trained) as new training data becomes available (e.g., as new information about application usage, data usage, user manual application update install information, etc. is generated).

While described as being stored at and executed by computing system 110, in some examples, some or all of application update repository 115, machine learning model 116, application update module 117, and model trainer 119 may be stored and/or executed at computing device 100 such that the functionality provided by one or more of application update repository 115, machine learning model 116, application update module 117, and model trainer 119 may be provided by computing device 100 without requiring computing device 100 to send and receive information with computing system 110. In other words, some or all of the techniques described in this disclosure may be performed locally at computing device 100.

Various aspects of the techniques may improve the operation of computing device 100 by increasing the security of computing device 100 and reducing application crashes caused by buggy applications installed at computing device 100. By automatically installing updates over metered data networks in this manner, the number of stale, buggy, or insecure applications installed at computing device 100 may be reduced, which may reduce bandwidth, processor, and power usage of the device. Further, managing application updates over metered data networks in this manner may reduce data overage charges caused by application updates.

Figure 2:
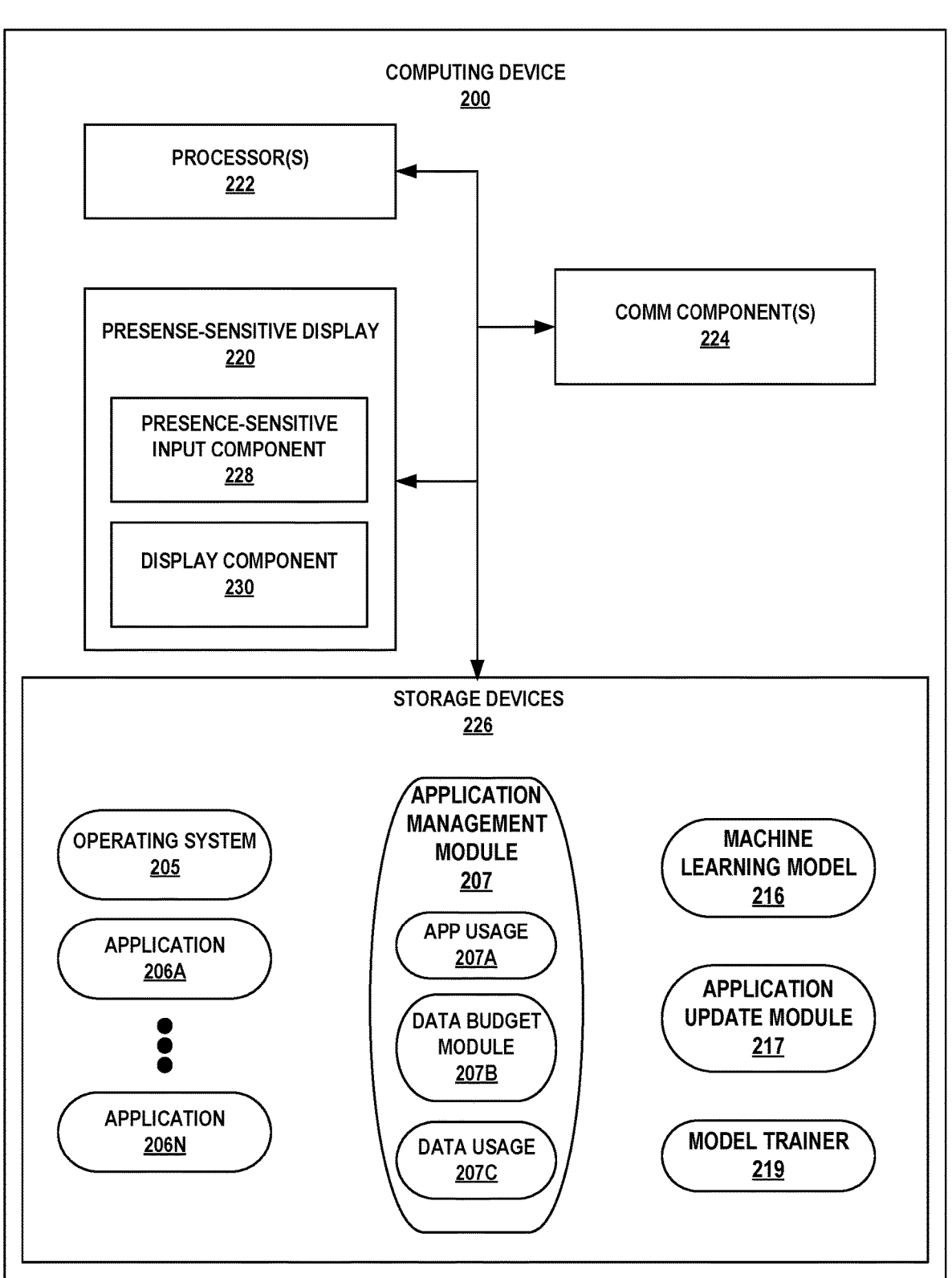
FIG. 2 is a block diagram illustrating an example computing device for managing application updates in accordance with techniques of this disclosure.

FIG. 2 is a block diagram illustrating an example computing device for managing application updates in accordance with techniques of this disclosure. Computing device 200 shown in the example of FIG. 2 is one example of computing device 100 shown in FIG. 1. Further, computing device 200 shown in the example of FIG. 2 locally implements a machine learning model and performs one or more other tasks that may otherwise be performed by computing system 110.

As shown in the example of FIG. 2, computing device 200 includes presence-sensitive display 220, which may be similar if not substantially similar to 120, one or more processors 222, one or more COMM components 224, which may be similar if not substantially similar to 124, and one or more storage devices 226. Storage devices 226 of computing device 200 may include an operating system 205 that provides an execution environment for one or more applications 206A-206N (collectively, "applications 206") as well as application management module 207, machine learning model 216, application update module 217, and model trainer 219. Modules 206-219 may be similar if not substantially similar to modules 106-119.

Presence-sensitive display 220 of computing device 200 may include functionality of an input component and/or an output component. In the example of FIG. 2, presence-sensitive display 220 may include a presence-sensitive input (PSI) component 228 ("PSI component 228"), such as a presence-sensitive screen or touch-sensitive screen. In some examples, presence-sensitive input component 228 may detect an object at and/or near the presence-sensitive input component. As one example range, presence-sensitive input component 228 may detect an object, such as a finger or stylus that is within two inches or less of presence-sensitive input component 228. Presence-sensitive input component 228 may determine a location (e.g., an (x,y) coordinate) of the presence-sensitive input component at which the object was detected. In another example range, presence-sensitive input component 228 may detect an object two inches or less from presence-sensitive input component 228 and other ranges are also possible. Presence-sensitive input component 228 may determine the location of presence-sensitive input component 228 selected by a user's finger using capacitive, inductive, and/or optical recognition techniques.

In some examples, presence-sensitive display 220 may also provide output to a user using tactile, audio, or video stimuli. For example, presence-sensitive display 220 may include display component 230 that displays a graphical user interface. Display component 230 may be any type of output component that provides visual output such as a liquid crystal display (LCD), dot matrix display, light emitting diode (LED) display, microLED display, organic light-emitting diode (OLED) display, e-ink, active-matrix organic light-emitting diode (AMOLED) display, etc. While illustrated as an integrated component of computing device 200, presence-sensitive display 220 may, in some examples, be an external component that shares a data or information path with other components of computing device 200 for transmitting and/or receiving input and output data.

For example, presence-sensitive display 220 may be a built-in component of computing device 200 located within and physically connected to the external packaging of computing device 200. In another example, presence-sensitive display 220 may be an external component of computing device 200 located outside and physically separated from the packaging of computing device 200. In some examples, presence-sensitive display 220, when located outside of and physically separated from the packaging of computing device 200, may be implemented by two separate components: a presence-sensitive input component 228 for receiving input and a display component 230 for providing output.

One or more processors 222 may implement functionality and/or execute instructions associated with computing device 200. Examples of processors 222 include application processors, display controllers, auxiliary processors, one or more sensor hubs, and any other hardware configured to function as a processor, a processing unit, or a processing device. Operating system 205, applications 206, application management module 207, machine learning model 216, and the like may be operable (or, in other words, executed) by processors 222 to perform various actions, operations, or functions of computing device 200. That is, modules 205-219 may form executable bytecode that, when executed, cause processors 222 to perform specific operations in accordance with (e.g., causing computing device 200 to become a specific-purpose computer by which to perform) various aspects of the techniques described herein. For example, processors 222 of computing device 200 may retrieve and execute instructions stored by storage devices 226 that cause processors 222 to perform the operations described herein that are attributed to operating system 205 and applications 206. The instructions, when executed by processors 222, may cause computing device 200 to store information within storage devices 226.

One or more storage devices 226 within computing device 200 may store information for processing during operation of computing device 200 (e.g., computing device 200 may store data accessed by operating system 205 during execution at computing device 200). Storage devices 226 may further store data associated with application management module 207, machine learning model 216, application update module 217, and model trainer 219.

In some examples, storage device 226 is a temporary memory, meaning that a primary purpose of storage device 226 is not long-term storage. Storage devices 226 on computing device 200 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

In some examples, storage devices 226 may also include one or more computer-readable storage media. Storage devices 226 in some examples include one or more non-transitory computer-readable storage mediums. Storage devices 226 may be configured to store larger amounts of information than typically stored by volatile memory Storage devices 226 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage devices 226 may store program instructions and/or information (e.g., data) associated with operating system 205, applications 206, application management module 207, machine learning model 216, application update module 217, and model trainer 219.

While examples are described where a computing device and/or a computing system analyzes information (e.g., application usage, device usage, installation histories, etc.) associated with a computing device and a user of a computing device, the computing device and/or computing system may analyze the information only if the computing device receives permission from the user of the computing device to analyze the information. For example, in situations discussed below, before a computing device or computing system may collect or may make use of information associated with a user, the user may be provided with an opportunity to provide input to control whether programs or features of the computing device and/or computing system may collect and make use of user information (e.g., information about a user's current location, current speed, etc.), or to dictate whether and/or how to the device and/or system may receive content that may be relevant to the user. In addition, certain data may be treated in one or more ways before it is stored or used by the computing device and/or computing system, so that personally identifiable information is removed. Thus, the user may have control over how information is collected about the user and used by the computing device and computing system.

To manage application updates over metered data networks in accordance with techniques of this disclosure, computing device 200 may execute (e.g., by using operating system 205, processors 222, storage devices 226, etc.) application management module 207 to automatically send a request for application update information for one or more applications 206 installed on computing device 200 to application update module 217. For the automatic application update process, computing device 200 may transmit the update request and the data associated with the application update without any interaction or activity on the part of the user of computing device 200. The device user does not need to, for example, review the request, input commands to computing device 200 to install the application update, or otherwise interact with the device for the installation to occur.

Applications 206 may include application 206A and application 206N, which may, for example, be a photography application and a music application, respectively. The request for application update information may include application management information, which computing device 200 may access by using application management module 207.

The application management information may include information identifying computing device 200 and configuration information pertaining to computing device 200. The application management information may also identify one or more applications installed on computing device 200. The application management information may include, for example, a listing of applications (e.g., application 206A, application 206N, etc.) installed on computing device 200. The information identifying the installed applications may include information such as a name (e.g., "photography application", "music application", etc.) or other text-based identifier and version information for the installed applications.

The application management information may also identify one or more granted permission settings associated with each installed application. The permission settings for each installed application may control how each application interacts with other parts of computing device 200, with network 108 and computing system 110, and with other devices. Permission settings may include connection settings. Connection settings may control how computing device 200 communicates with other devices using, for example, USB, Bluetooth®, WIFI, or other communication methods.

The connection settings may also include the option of the device user setting a network preference for downloading application updates. For example, the device user may set a network preference to automatically download application updates only when computing device 200 is connected to the internet via an unmetered data network (e.g., WIFI), only download application updates smaller than a particular number of MBs when connected to metered data networks, or update using limited amount of data when connected to a metered data network. When the auto update with limited amount of data option is selected, computing device 200 is configured to download application updates while using only a limited portion of mobile data.

Application update module 217 may use the application management information to determine a set of applications installed on computing device 200 that need to be updated. For example, application update module 217 may determine that photography application 206A and music application 206N as well as a social network application and an email application each have a pending application update available. Application update module 217 may determine an update size for the application update install packages for each of the four applications. As one example, the update for photography application is 50 MB, the update for music application 206N is 15 MB, the update for the social network application is 10 MB, and the update for the email application is 10 MB.

In order to determine which application updates may be installed using the metered data network during the current automatic application update process, data budget module 207B of application management module 207 may determine an available data budget. A monthly and/or daily data budget may be configured to set amounts (e.g., by a user) or may be dynamically determined (e.g., during the automatic update process). In instances where the data budgets are configured, the user of computing device 200 may manually enter desired maximum amounts of metered data to be used for application updates for various time periods. In instances where the data budgets are dynamically determined, data budget module 207B may analyze actual data usage information for data used over the metered data network (e.g., as determined by data usage 207C) and a median amount of data used for manual application updates for a country or other geographic region in which the user is located. In some examples, data usage 207C may determine a total amount of metered data usage by computing device 200 and/or for the user across two or more computing devices associated with the user for a prior time period (e.g., the last billing cycle, last month, the last 30-days, etc.). In some examples, data budget module 207B may dynamically determine data budgets by providing one or more of historical data usage while on a metered data network, data usage incurred by the user performing manual application updates over the metered data network, aggregated average metered data network usage for a particular geographic region/market, amount of data remaining in the data plan for the current billing period, age of the application update, type of the application update (e.g., security update, feature update, etc.), cost of additional data beyond the data allowance for the billing period, etc. as inputs to machine learning model 216.

Machine learning model 216 may take the various inputs and determine the sliding window data budget and daily data budget. As one example, a user has a 1 GB metered data network data allowance per billing period, used 800 MB of data on the metered data network during the previous billing period including data for application updates, used 400 MB of data for manual application updates last billing period, the country's median data usage for manual application updates is 100 MB per billing period, and data is $0.02 per MB over the 1 GB data allowance. Machine learning model 216 may take these inputs and output the following data budget: a 30-day sliding window budget of 300 MB for application updates and a daily budget of 20 MB for application updates. Generally, the 30-day sliding window budget is configured to not be permitted to be exceeded while the daily budget may be exceeded. Other sliding window durations, sliding window data budget amounts, and daily data budget amounts are contemplated and may be used with the techniques of this disclosure.

Machine learning model 216 may represent one or more of various different types of machine-learned models. In particular, in some examples, machine learning model 216 may perform regression, clustering, anomaly detection, and/or other tasks. In some examples, machine learning model 216 may perform regression to provide output data in the form of a continuous numeric value. The continuous numeric value may correspond to any number of different metrics or numeric representations, including, for example, currency values, scores, or other numeric representations. As examples, machine learning model 216 may perform linear regression, polynomial regression, or nonlinear regression. As examples, machine learning model 216 may perform simple regression or multiple regression. As described above, in some examples, a Softmax function or other function or layer may be used to squash a set of real values respectively associated with two or more possible classes to a set of real values in the range (0, 1) that sum to one.

Machine learning model 216 may perform various types of clustering. For example, machine learning model 216 may identify one or more previously defined clusters to which the input data most likely corresponds. Machine learning model 216 may identify one or more clusters within the input data. That is, in instances in which the input data includes multiple objects, documents, or other entities, machine learning model 216 may sort the multiple entities included in the input data into a number of clusters. In some examples in which machine learning model 216 performs clustering, machine learning model 216 may be trained using unsupervised learning techniques.

Machine learning model 216 may perform anomaly detection or outlier detection. For example, machine learning model 216 may identify input data that does not conform to an expected pattern or other characteristic (e.g., as previously observed from previous input data). As examples, the anomaly detection may be used for detecting failures to install application updates.

Application management module 207 may determine which updates to download and install during the current auto update process and which updates may need to be scheduled to be downloaded and installed during a future auto update process. In various instances, application management module 207 may prioritize various outstanding application updates based on a variety of factors including, for example, the type of application update, the age of the application update, how much the user of computing device 200 users the application with the outstanding update, etc. In order to prioritize the applications, application management module 207 may apply machine learning model 216 and/or a different machine learning model.

Machine learning model 216 may take a variety of signals as inputs and provide a priority score for each application update indicative of the update priority for the corresponding application update. For example, application management module 207 may provide, as inputs to machine learning model 216, one or more of application update type, application update history for the user, application category, application usage information for the application (e.g., provided by application ("app") usage 207A), and application update age (i.e., the amount of time that has passed since the application update was first released), as non-limiting examples. Application usage 207A may include information about the frequency, duration, and the like the user of computing device 200 uses each of applications 206. Further, application usage 207A may include such information for any devices or users that download, install, or otherwise interact with an application store provided by computing system 110 of FIG. 1. For example, the information about the frequency the user uses each application may include the number of times the user opens the application, the number of times the user interacts with the application, the amount of time the user interacts with the application, and the like for a pre-determined time period (e.g., a day, week, month, etc.).

Machine learning model 216 processes the inputs and may generate an update priority score for applications having pending updates. As one example, machine learning model 216 generated an update priority score for photography application 206A of 60, an update priority score for music application 106N of 85, an update priority score for the social network application of 40, and an update priority score for the email application of 90. The magnitude of the update priority score may be indicative of the priority of the application update. Thus, an update priority score of 85 may indicate that the application update for music application 206N is of higher priority than photography application 206A with an update priority score of 60.

Application management module 207 may determine, based on the update priority scores, an order in which to schedule application updates such that the application updates do not exceed the allocated data budget for the day, sliding window, and/or remaining data for the current billing period. For example, the order of the application updates may indicate that computing device 200 should send an update request for the email application first, followed by music application 206N, photography application 206A, and, lastly, the social networking application because application 206N has the largest update priority score and the social network application has the smallest update priority score.

Continuing the example from above, machine learning model 216 determined a data budget having a 30-day sliding window budget of 300 MB and a daily budget of 20 MB for application updates. As also set forth in an example above, an update for photography application is 50 MB, an update for music application 206N is 15 MB, an update for the social network application is 10 MB, and an update for the email application is 10 MB. Given these parameters as well as the priority scores for each of the applications, application management module 207 may schedule the email application and music application 206N updates to be installed today during the current auto update process, schedule photography application 206A update to be installed tomorrow, and the social network application update to be installed the following day as the total amount of data required for all of the updates is less than the 30-day sliding window budget of 300 MB and the daily budget of 20 MB may be exceeded. That is, application management module 207 schedules both the email application and music application 206N updates to be installed during the current update process even though, combined, 25 MB of data is required, which exceeds the daily budget, because, after allocating the 10 MB required to download the email application update, there is still 10 MB remaining in the daily budget and 290 MB remaining in the 30-day sliding window budget. As such, the 15 MB required to download the update for music application 206N can be downloaded. However, when application management module 207 goes to schedule the update for photography application 206A, there is no data left in the daily budget, so the update gets scheduled for the next day. Similarly, because the update for photography application 206A is greater than the daily 20 MB budget, application management module 207 schedules the update for the social network application for the following day.

Application update module 217 may send an update request for at least one application from the set of applications to a computing system (e.g., computing system 110) using COMM components 224. Computing system 110 may initiate, responsive to the update request, installation of the at least one application update for computing device 200 to install. That is, computing system 110 may send the application update installation package for at least one application to computing device 200. Application management module 207 may cause one or more processors 222 to execute the application update installation package and install the application update at computing device 200.

In some examples, computing device 200 may include model trainer 219. That is, model trainer 219 may train machine learning model 216 in an offline fashion or an online fashion. In offline training (also known as batch learning), machine learning model 216 may be trained on the entirety of a static set of training data. In online learning, machine learning model 216 may be continuously trained (or re-trained) as new training data becomes available (e.g., as new information about application usage, installation history, and context is generated). Model trainer 219 may perform centralized training of machine learning model 216 (e.g., based on a centrally stored dataset). In other examples, decentralized training techniques such as distributed training, federated learning, or the like may be used to train, update, or personalize machine learning model 216.

Model trainer 219 may train machine learning model 216 using one or more metrics (e.g., data usage metric, data allowance metric, application freshness metric, application update type metric, etc.). For example, model trainer 219 may attempt to optimize the objective function. The objective function may be to maximize effectiveness of machine learning model 216 based on the data usage metric, data allowance metric, application freshness metric, and the application update type metric. As a result, model trainer 219 may improve the effectiveness of machine learning model 216 to output data budgets and update priority scores that are indicative of the amount of data available for application updates and the relative importance of the application updates to the user, respectively.

In some examples, machine learning model 216 may be trained by optimizing an objective function, such as the effectiveness of machine learning model 216. The objective function may be or include a loss function that compares (e.g., determines a difference between) output data generated by the model from the training data and labels (e.g., ground-truth labels) associated with the training data. For example, the loss function may evaluate a sum or mean of squared differences between the output data and the labels. In some examples, the objective function may be or include a cost function that describes a cost of a certain outcome or output data. Other examples of the objective function may include margin-based techniques such as, for example, triplet loss or maximum-margin training.

One or more of various optimization techniques may be performed to optimize the objective function. For example, the optimization technique(s) may minimize or maximize the objective function. Example optimization techniques include Hessian-based techniques and gradient-based techniques, and the like. Other optimization techniques include black box optimization techniques and heuristics.

In some examples, backward propagation of errors may be used in conjunction with an optimization technique (e.g., gradient based techniques) to train machine learning model 216 (e.g., when a machine-learned model is a multi-layer model such as an artificial neural network). For example, an iterative cycle of propagation and model parameter (e.g., weights) update may be performed to train machine learning model 216. Example backpropagation techniques include truncated backpropagation through time, Levenberg-Marquardt backpropagation, and the like.

While computing device 200 of FIG. 2 is shown as including machine learning model 216, application update module 217, and model trainer 219, in other examples one or more of modules 216, 217, or 219 may be stored at a remote computing system (e.g., computing system 110 of FIG. 1) and the functionality provided by modules 216, 217, or 219 may be provided by such a remote computing system. By including one or more of modules 216, 217, or 219, computing device 200 may perform techniques of this disclosure on device (i.e., without sending application usage information, network settings information, application installation information, application update history information, etc.) to a remote computing system.

Figure 3:
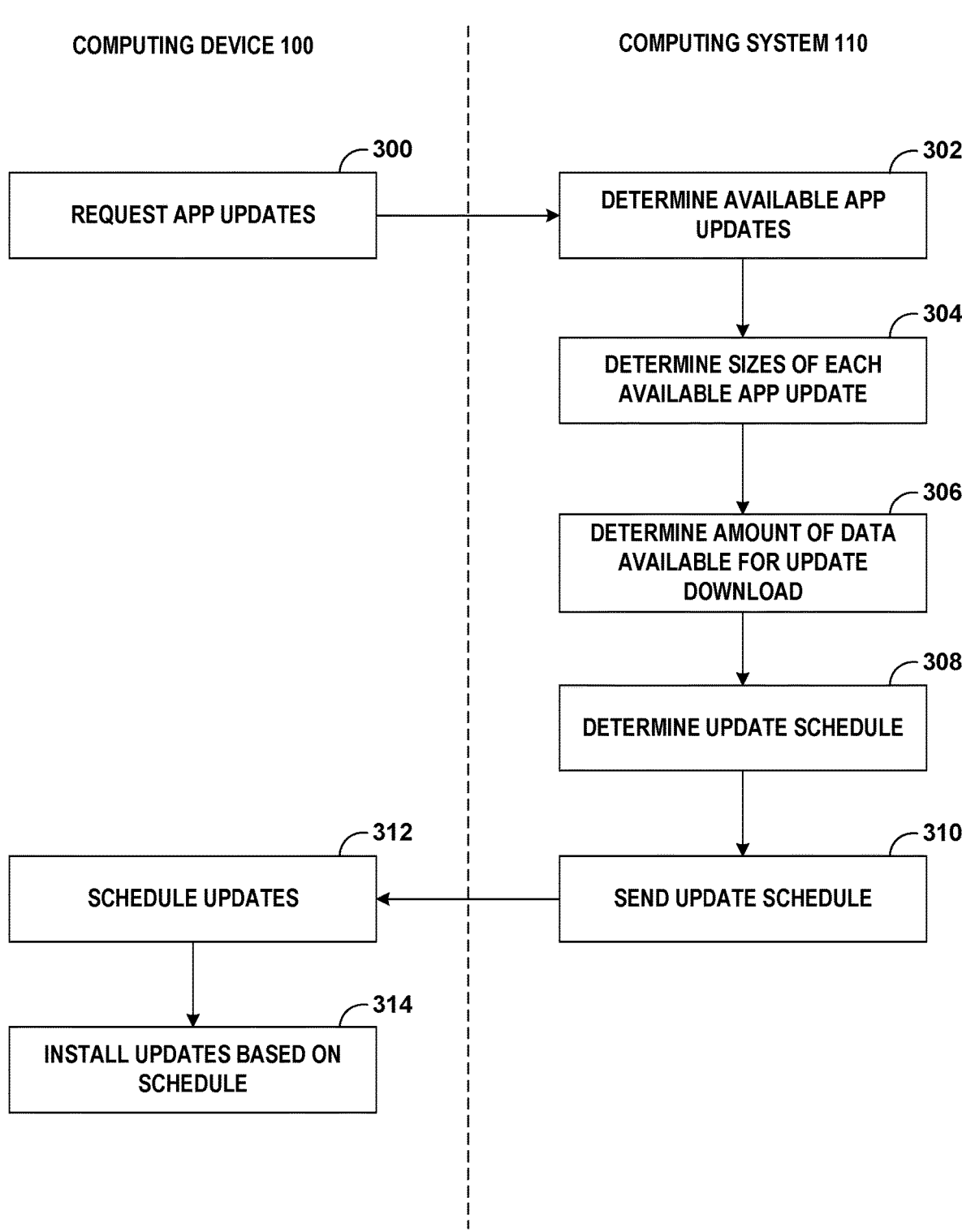
FIG. 3 is a flowchart illustrating an exemplary operation of the computing system and computing device in accordance with techniques of this disclosure.

FIG. 3 is a flowchart illustrating an exemplary operation of the computing system and computing device in accordance with techniques of this disclosure. In the example of FIG. 3, computing device 100 and computing system 110 may operate to manage the download and installation of updates for a set of applications installed on computing device 100 by identifying application updates that require an amount of data that satisfies various data budgets. Computing device 100 and the computing system 110 may apply machine learning model 116 to determine the application update data budget and/or to determine update priority scores for a set of application updates, which computing device 100 may use to prioritize (e.g., rank) the application updates such that the more important updates are given priority to consume the application update data budget.

As shown in FIG. 3, application management module 107 may initial an automatic update process and send, to computing system 110, a request for application update information (300). Computing device 100 may execute application management module 107 to send (e.g., by using COMM components 124) the request for application update information to application update module 117 of computing system 110. Applications 106 may include application 106A and application 106N, which may, for example, be a photography application and a music application, respectively. The request for application update information may include application management information, which computing device 100 may access by using application management module 107.

Application update module 117 of computing system 110 may receive the request and determine any updates available for one or more applications 106 installed on computing device 100 (302). For example, application update module 117 may perform a lookup in application update repository 115 to determine which, if any, of applications identified in the application update information have outstanding updates. Application update module 117 may execute a query to retrieve current version information for one or more of these applications. Application update module may compare the retrieved current version information to the currently installed version of photography application 106A and music application 106N. Based on the version information comparison, application update module 117 may determine that one or more of the applications have outstanding updates and include those applications in the set of applications.

Application update module 117 may determine the sizes of each of the application update install packages for the applications having outstanding updates (304). For example, application update module 117 may determine that photography application 106A has an update that is 50 MB and music application 106N has an update that is 25 MB.

Computing system 110 determines an amount of data available for downloading application updates over a metered data network (306). For example, machine learning model 116 may take one or more of historical data usage while on a metered data network, data usage incurred by the user performing manual application updates over the metered data network, aggregated average metered data network usage for a particular geographic region/market, amount of data remaining in the data plan for the current billing period, age of the application update, type of the application update (e.g., security update, feature update, etc.), cost of additional data beyond the data allowance for the billing period, etc. as inputs and, based on the inputs, output the application data update budgets for metered data networks. Using the data budgets and application update data usage information during the sliding window and day time periods, application update module 117 may determine how much data is available for downloading additional updates over a metered data network (306).

Computing system 110 schedules the outstanding application updates as either being currently downloadable using any network (including a metered data network) or only being currently downloadable using an unmetered data network (i.e., because the update would exceed the daily and/or sliding window application update data budgets) (308). For example, if the sliding window application update data budget is 300 MB, the daily application update data budget is 40 MB, and there is a 400 MB application update, application update module 117 schedules the 400 MB application update to occur when computing device 100 is connected to an unmetered data network. However, if the application update were 10 MB instead of 400 MB, the application update would satisfy both the sliding window and daily application update data budgets and, thus, application update modules 217 schedules the update to occur using any data network, including metered data networks. Computing system 110 sends the update schedule to computing device 100 (310).

Computing device 100 schedules the updates (312) according to the update schedule information received from computing system 110 and proceeds to download and install the updates according to the schedule (314). For example, application management module 207 determines that an update for photography application 206A is scheduled to be downloaded and installed during the current automatic application update process. Based on this determination, application management module 207 sends, via comm components 124 and network 108, a request to download the application update install package from computing system 110. After downloading at least a minimum amount of the application update install package, application management module 107 initiates installation of the update by, for example, causing one or more processors of computing device 100 to execute the instructions (i.e., computer code) included in the application update install package.

FIG. 4 is a flowchart illustrating another exemplary operation of the computing system and computing device in accordance with techniques of this disclosure. In the example of FIG. 4, rather than computing system 110 determining the application update budgets and determining the schedule for the application updates, computing device 100 is configured to determine the application update budgets and the application update schedule. As shown in FIG. 4, computing device 100 sends a request for application update information to computing system 110 (400).

Computing system 110 receive the application update request and, in response, determines any available application updates (402), determines the size of each of the application updates (404) and sends the update information to computing device 100 (406) in a manner consistent to that described above with respect to any of FIGS. 1-3.

While computing system 110 is performing any of steps 402, 404, and 406 or after receiving the update information from computing system 110, computing device 100 determines the amount of data available for downloading application updates over a metered data network (408). Computing device 100 may determine sliding window and daily application update data budgets as well as an amount of data already used for application updates during the sliding window and today as discussed with respect to any of FIGS. 1-3.

Computing device 100 schedules the outstanding application updates based on whether the updates can be downloaded over a metered data network and based on available data budget to download the updates over a metered data network (410). When scheduling updates that may be downloaded over a metered data network, computing device 100 schedules the updates such that the updates can be downloaded over any data network, not such a metered data network. This way, if computing device 100 is connected to an unmetered data network, all available application updates, whether scheduled to be downloaded over a metered data network or not, can be downloaded and installed by computing device 100.

Using the application update schedule, computing device 100 determines which application updates can be downloaded and installed during the current automatic application update process and requests the application update install packages from computing system 110 (412). Computing system 110 receives the request (414) and sends the requested application update install packages to computing device 100 (e.g., via network 108) (416). Computing device 100 receives the application update install packages and installs the application updates (418).

While FIGS. 3 and 4 are described and illustrated as two different examples, the operations illustrated in FIGS. 3 and 4 may be combined such that both computing device 100 and computing system 110 perform different portions of the application update management process described herein. For example, while shown in FIG. 4 as being performed by computing device 100, step 408 of determining the amount of data available for application update downloads may be performed by computing system 110. Similarly, while shown in FIG. 3 as being performed by computing system 110, step 308 of determining the application update schedule may be performed by computing device 100. Further, one or more steps of FIGS. 3 and 4 may be optional and may be performed in any order unless a particular step requires a result produced by a different step in order to perform the specified actions of the particular step This disclosure includes the following examples.

Example 1: A method includes determining, by a computing system, a set of available application updates for one or more applications installed at a computing device, determining, based at least in part on an amount of metered data available during a time period and an amount of metered data used during the time period, an application update data budget for downloading application updates over a metered data network, and determining a respective amount of data required to download each available application update from the set of available application updates. The method may also include scheduling, based the respective amounts of data required to download each available application update, a first set of application updates to be downloaded using the metered data network or an unmetered data network and a second set of application updates to be downloaded using only the unmetered data network, and, responsive to determining that the computing device is connected to the metered data network, initiating download of the first set of application updates.

Example 2: The method of example 1, wherein determining the application update data budget includes determining a sliding window application update data budget and determining a daily application update data budget.

Example 3: The method of example 2, wherein scheduling the first set of application update and the second set of application updates comprises: determining, based on the respective amount of data required to download each of the available application updates, whether each application update from the set of available application updates is downloadable using a metered data network without exceeding the sliding window application update data budget, and determining, based on the respective amount of data required to download each of the available application updates, whether any data budget from the daily application update data budget remains after downloading any other updates scheduled to be downloaded on a particular day. The method may also include, responsive to determining that either the sliding window application update data budget would be exceeded for a particular application update from the set of available application updates or that there is no remaining data budget from the daily application update data budget, including the particular application update in the second set of application updates, and, responsive to determining that the sliding window application update data would not be exceeded for the particular application update and that there is remaining data budget from the application update data budget, including the particular application update in the first set of application updates.

Example 4: The method of example 2 or 3, wherein the respective amount of data required to download a particular application update exceeds the sliding window application update data budget or the daily application update data budget, the method further comprising: determining whether fewer than a threshold number of days remain in a data plan billing period, and, responsive to determining that fewer than the threshold number of days remain in the data plan billing period: determining whether the respective amount of data required to download the particular application update is less than a total amount of unused data in the data plan billing period, and, responsive to determining that the respective amount of data required to download the particular application update is less than the total amount of unused data in the data plan billing period, including the particular application update in the first set of application updates.

Example 5: The method of any of examples 1 through 4, further comprising: determining a respective application update priority score for each application included in the set of available updates based on one or more of a corresponding application update type, a corresponding application update history, a corresponding application category, corresponding application usage information, and a corresponding application update age, and ordering, based on the respective application update priority scores, the set of available application updates.

Example 6: The method of example 5, wherein scheduling the first set of application updates and the second set of application updates is further based on the ordering of the set of available application updates, and wherein downloading the first set of application updates includes downloading each application update included in the first set of application updates according to the ordering of the set of available application updates.

Example 7: The method of any of examples 1 through 6, further comprising: determining, based on one or more of historical data usage while on the metered data network and a data allowance associated with the computing device, whether the computing device is eligible for data usage-based application update management, wherein scheduling the first set of application updates to be downloaded using the metered data network or an unmetered data network and the second set of application updates to be downloaded using only the unmetered data network is in response to determining that the computing device is eligible for the data usage-based application update management.

Example 8: The method of any of examples 1 through 7, wherein determining the application update data budget is further based on one or more of historical data usage while on a metered data network, data usage incurred by a user performing manual application updates over the metered data network, aggregated average metered data network usage for a particular geographic region/market, amount of data remaining in a data plan for a current billing period, age of the application update, type of the application update.

Example 9: The method of any of examples 1 through 8, wherein one or more of determining the application update data budget, scheduling the first set of application updates and the second set of application updates, and initiating the download of the first set of application updates is performed by the computing device.

Example 10. The method of any of examples 1 through 9, wherein one or more of determining the application update data budget, scheduling the first set of application updates and the second set of application updates, and initiating the download of the first set of application updates is performed by the computing system.

Example 11: A computing system includes a memory; and one or more processors configured to: determine a set of available application updates for one or more applications installed at a computing device, determine, based at least in part on an amount of metered data available during a time period and an amount of metered data used during the time period, an application update data budget for downloading application updates over a metered data network, and determine a respective amount of data required to download each available application update from the set of available application updates. The one or more processors may also be configured to schedule, based the respective amounts of data required to download each available application update, a first set of application updates to be downloaded using the metered data network or an unmetered data network and a second set of application updates to be downloaded using only the unmetered data network, and, responsive to determining that the computing device is connected to the metered data network: send, to the computing device, the first set of application updates.

Example 12: The computing system of example 11, wherein the one or more processors are configured to determine the application update data budget by at least being configured to determine a sliding window application update data budget, and to determine a daily application update data budget.

Example 13: The computing system of example 12, wherein the one or more processors are configured to schedule the first set of application update and the second set of application updates by at least being configured to: determine, based on the respective amount of data required to download each of the available application updates, whether each application update from the set of available application updates is downloadable using a metered data network without exceeding the sliding window application update data budget; determine, based on the respective amount of data required to download each of the available application updates, whether any data budget from the daily application update data budget remains after downloading any other updates scheduled to be downloaded on a particular day: responsive to determining that either the sliding window application update data budget would be exceeded for a particular application update from the set of available application updates or that there is no remaining data budget from the daily application update data budget, include the particular application update in the second set of application updates: and, responsive to determining that the sliding window application update data would not be exceeded for the particular application update and that there is remaining data budget from the application update data budget, include the particular application update in the first set of application updates.

Example 14: The computing system of example 12, wherein the respective amount of data required to download a particular application update exceeds the sliding window application update data budget or the daily application update data budget, the one or more processors are further configured to: determine whether fewer than a threshold number of days remain in a data plan billing period, and, responsive to determining that fewer than the threshold number of days remain in the data plan billing period: determine whether the respective amount of data required to download the particular application update is less than a total amount of unused data in the data plan billing period, and, responsive to determining that the respective amount of data required to download the particular application update is less than the total amount of unused data in the data plan billing period, include the particular application update in the first set of application updates.

Example 15: The computing system of any of examples 10 through 14, wherein the one or more processors are further configured to: determine a respective application update priority score for each application included in the set of available updates based on one or more of a corresponding application update type, a corresponding application update history, a corresponding application category, corresponding application usage information, and a corresponding application update age, and ordering, based on the respective application update priority scores, the set of available application updates.

Example 16: The computing system of example 15, wherein the one or more processors are configured to schedule the first set of application updates and the second set of application updates based on the ordering of the set of available application updates, and configured to download the first set of application updates by at least downloading each application update included in the first set of application updates according to the ordering of the set of available application updates.

Example 17: The computing system of any of examples 10 through 16, wherein the one or more processors are further configured to determine based on one or more of historical data usage while on the metered data network and a data allowance associated with the computing device, whether the computing device is eligible for data usage-based application update management, wherein the processors are configured to schedule the first set of application updates to be downloaded using the metered data network or an unmetered data network and the second set of application updates to be downloaded using only the unmetered data network is in response to determining that the computing device is eligible for the data usage-based application update management.

Example 18. The computing system of any of examples 10 through 17, wherein the processors are configured to determine the application update data budget is further based on one or more of historical data usage while on the metered data network, data usage incurred by a user performing manual application updates over the metered data network, aggregated average metered data network usage for a particular geographic region, amount of data remaining in a data plan for a current billing period, age of the application update, type of the application update.

Example 19: A non-transitory computer-readable storage medium encoded with instructions that, when executed by one or more processors of a computing system, cause the one or more processors to: determine a set of available application updates for one or more applications installed at a computing device, determine, based at least in part on an amount of metered data available during a time period and an amount of metered data used during the time period, an application update data budget for downloading application updates over a metered data network, and determine a respective amount of data required to download each available application update from the set of available application updates. The one or more processors may also be configured to schedule, based the respective amounts of data required to download each available application update, a first set of application updates to be downloaded using the metered data network or an unmetered data network and a second set of application updates to be downloaded using only the unmetered data network, and, responsive to determining that the computing device is connected to the metered data network: send, to the computing device, the first set of application updates.

Example 20: The non-transitory computer-readable storage medium of example 19, wherein the instructions cause the one or more processors to determine the application update data budget by at least causing the one or more processors to determine a sliding window application update data budget, and to determine a daily application update data budget.

Example 21: The non-transitory computer-readable storage medium of example 20, wherein the instructions cause the one or more processors to schedule the first set of application update and the second set of application updates by at least causing the one or more processors to: determine, based on the respective amount of data required to download each of the available application updates, whether each application update from the set of available application updates is downloadable using a metered data network without exceeding the sliding window application update data budget; determine, based on the respective amount of data required to download each of the available application updates, whether any data budget from the daily application update data budget remains after downloading any other updates scheduled to be downloaded on a particular day; responsive to determining that either the sliding window application update data budget would be exceeded for a particular application update from the set of available application updates or that there is no remaining data budget from the daily application update data budget, include the particular application update in the second set of application updates; and, responsive to determining that the sliding window application update data would not be exceeded for the particular application update and that there is remaining data budget from the application update data budget, include the particular application update in the first set of application updates.

Example 22: The non-transitory computer-readable storage medium of example 20, wherein the respective amount of data required to download a particular application update exceeds the sliding window application update data budget or the daily application update data budget, the instructions further cause one or more processors to: determine whether fewer than a threshold number of days remain in a data plan billing period, and, responsive to determining that fewer than the threshold number of days remain in the data plan billing period: determine whether the respective amount of data required to download the particular application update is less than a total amount of unused data in the data plan billing period, and, responsive to determining that the respective amount of data required to download the particular application update is less than the total amount of unused data in the data plan billing period, include the particular application update in the first set of application updates.

Example 23: The non-transitory computer-readable storage medium of any of examples 19 through 22, wherein the instructions further cause the one or more processors to determine a respective application update priority score for each application included in the set of available updates based on one or more of a corresponding application update type, a corresponding application update history, a corresponding application category, corresponding application usage information, and a corresponding application update age, and ordering, based on the respective application update priority scores, the set of available application updates.

Example 24: The non-transitory computer-readable storage medium of example 23, wherein the instructions cause the one or more processors to schedule the first set of application updates and the second set of application updates based on the ordering of the set of available application updates, and to download the first set of application updates by at least downloading each application update included in the first set of application updates according to the ordering of the set of available application updates.

Example 25: The non-transitory computer-readable storage medium of any of examples 19 through 24, wherein the instructions further cause the one or more processors to determine based on one or more of historical data usage while on the metered data network and a data allowance associated with the computing device, whether the computing device is eligible for data usage-based application update management, wherein the processors are configured to schedule the first set of application updates to be downloaded using the metered data network or an unmetered data network and the second set of application updates to be downloaded using only the unmetered data network is in response to determining that the computing device is eligible for the data usage-based application update management.

Example 26: The non-transitory computer-readable storage medium of any of examples 19 through 25, wherein the instructions cause the one or more processors to determine the application update data budget by at least causing the one or more processors to determine the application update data budget based on one or more of historical data usage while on the metered data network, data usage incurred by a user performing manual application updates over the metered data network, aggregated average metered data network usage for a particular geographic region, amount of data remaining in a data plan for a current billing period, age of the application update, type of the application update Example 27. A computing system including means for performing any combination of the methods of examples 1-10.

Example 28: A computer-readable storage medium encoded with instructions that cause a computing device to perform any combination of the methods of examples 1-10.

By way of example, and not limitation, such computer-readable storage media can comprise RAM, ROM. EEPROM. CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:

determining, by a computing system, a set of available application updates for one or more applications installed at a computing device;

determining, based at least in part on an amount of metered data available during a time period and an amount of metered data used during the time period, an application update data budget for downloading application updates over a metered data network by at least determining one or more of a sliding window application update data budget and a daily application update data budget;

determining a respective amount of data required to download each available application update from the set of available application updates;

scheduling, based the respective amounts of data required to download each available application update, a first set of application updates to be downloaded using the metered data network or an unmetered data network and a second set of application updates to be downloaded using only the unmetered data network;

responsive to determining that the respective amount of data required to download a particular application update exceeds the sliding window application update data budget or the daily application update data budget:

determining whether fewer than a threshold number of days remain in a data plan billing period;

responsive to determining that fewer than the threshold number of days remain in the data plan billing period, determining whether the respective amount of data required to download the particular application update is less than a total amount of unused data in the data plan billing period; and responsive to determining that the respective amount of data required to download the particular application update is less than the total amount of unused data in the data plan billing period, including the particular application update in the first set of application updates; and responsive to determining that the computing device is connected to the metered data network, initiating download of the first set of application updates.

2. The method of claim 1, wherein scheduling the first set of application update and the second set of application updates comprises:

determining, based on the respective amount of data required to download each of the available application updates, whether each application update from the set of available application updates is downloadable using a metered data network without exceeding the sliding window application update data budget;

determining, based on the respective amount of data required to download each of the available application updates, whether any data budget from the daily application update data budget remains after downloading any other updates scheduled to be downloaded on a particular day;

responsive to determining that either the sliding window application update data budget would be exceeded for a particular application update from the set of available application updates or that there is no remaining data budget from the daily application update data budget, including the particular application update in the second set of application updates; and responsive to determining that the sliding window application update data would not be exceeded for the particular application update and that there is remaining data budget from the application update data budget, including the particular application update in the first set of application updates.

3. The method of claim 1, further comprising:

determining a respective application update priority score for each application included in the set of available updates based on one or more of a corresponding application update type, a corresponding application update history, a corresponding application category, corresponding application usage information, and a corresponding application update age; and ordering, based on the respective application update priority scores, the set of available application updates.

4. The method of claim 3, wherein scheduling the first set of application updates and the second set of application updates is further based on the ordering of the set of available application updates, and wherein downloading the first set of application updates includes downloading each application update included in the first set of application updates according to the ordering of the set of available application updates.

5. The method of claim 1, further comprising:

determining, based on one or more of historical data usage while on the metered data network and a data allowance associated with the computing device, whether the computing device is eligible for data usage-based application update management, wherein scheduling the first set of application updates to be downloaded using the metered data network or an unmetered data network and the second set of application updates to be downloaded using only the unmetered data network is in response to determining that the computing device is eligible for the data usage-based application update management.

6. The method of claim 1, wherein determining the application update data budget is further based on one or more of historical data usage while on the metered data network, data usage incurred by a user performing manual application updates over the metered data network, aggregated average metered data network usage for a particular geographic region, amount of data remaining in a data plan for a current billing period, age of the application update, and type of the application update.

7. The method of claim 1, wherein one or more of determining the application update data budget, scheduling the first set of application updates and the second set of application updates, and initiating the download of the first set of application updates is performed by the computing device.

8. The method of claim 1, wherein one or more of determining the application update data budget, scheduling the first set of application updates and the second set of application updates, and initiating the download of the first set of application updates is performed by the computing system.

9. The method of claim 1, wherein determining the application update data budget comprises:

applying, by the computing system, a machine learning model to determine the application update data budget based on one or more of: historical data usage while on the metered data network; data usage incurred by a user performing manual application updates over the metered data network; aggregated average metered data network usage for a particular geographic region or market; an amount of data remaining in the data plan for the current data plan billing period; an age of the application update; a type of the application update; and a cost of additional data beyond a data allowance for the data plan billing period.

10. The method of claim 9, further comprising:

training the machine learning model using an objective function that maximizes an effectiveness of the machine learning model based on one or more of a data usage metric, a data allowance metric, and an application freshness metric.

11. The method of claim 1, further comprising:

identifying that a first application update included in the set of available application updates comprises a security update;

identifying that a second application update included in the set of available application updates does not comprise a security update; and prioritizing the first application update for inclusion in the first set of application updates over the second application update.

12. The method of claim 1, further comprising:

responsive to determining that the computing device has connected to an unmetered data network prior to completion of downloading the first set of application updates via the metered data network, sending the first set of application updates to the computing device via the unmetered data network.

13. A computing system comprising:

a memory; and one or more processors configured to:

determine a set of available application updates for one or more applications installed at a computing device;

determine, based at least in part on an amount of metered data available during a time period and an amount of metered data used during the time period, an application update data budget for downloading application updates over a metered data network by at least determining one or more of a sliding window application update data budget and a daily application update data budget;

determine a respective amount of data required to download each available application update from the set of available application updates;

schedule, based the respective amounts of data required to download each available application update, a first set of application updates to be downloaded using the metered data network or an unmetered data network and a second set of application updates to be downloaded using only the unmetered data network;

responsive to determining that the respective amount of data required to download a particular application update exceeds the sliding window application update data budget or the daily application update data budget:

determine whether fewer than a threshold number of days remain in a data plan billing period;

responsive to determining that fewer than the threshold number of days remain in the data plan billing period, determine whether the respective amount of data required to download the particular application update is less than a total amount of unused data in the data plan billing period; and responsive to determining that the respective amount of data required to download the particular application update is less than the total amount of unused data in the data plan billing period, include the particular application update in the first set of application updates; and responsive to determining that the computing device is connected to the metered data network, send, to the computing device, the first set of application updates.

14. The computing system of claim 13, wherein the one or more processors are configured to schedule the first set of application update and the second set of application updates by at least being configured to:

determine, based on the respective amount of data required to download each of the available application updates, whether each application update from the set of available application updates is downloadable using a metered data network without exceeding the sliding window application update data budget;

determine, based on the respective amount of data required to download each of the available application updates, whether any data budget from the daily application update data budget remains after downloading any other updates scheduled to be downloaded on a particular day;

responsive to determining that either the sliding window application update data budget would be exceeded for a particular application update from the set of available application updates or that there is no remaining data budget from the daily application update data budget, include the particular application update in the second set of application updates; and responsive to determining that the sliding window application update data would not be exceeded for the particular application update and that there is remaining data budget from the application update data budget, include the particular application update in the first set of application updates.

15. The computing system of claim 13, wherein the one or more processors are further configured to:

determine a respective application update priority score for each application included in the set of available updates based on one or more of a corresponding application update type, a corresponding application update history, a corresponding application category, corresponding application usage information, and a corresponding application update age;

order, based on the respective application update priority scores, the set of available application updates;

schedule the first set of application updates and the second set of application updates based on the ordering of the set of available application updates; and download the first set of application updates by at least downloading each application update included in the first set of application updates according to the ordering of the set of available application updates.

16. A non-transitory computer-readable storage medium encoded with instructions that, when executed by one or more processors of a computing system, cause the one or more processors to:

determine a set of available application updates for one or more applications installed at a computing device;

determine, based at least in part on an amount of metered data available during a time period and an amount of metered data used during the time period, an application update data budget for downloading application updates over a metered data network by at least determining one or more of a sliding window application update data budget and a daily application update data budget;

determine a respective amount of data required to download each available application update from the set of available application updates;

schedule, based the respective amounts of data required to download each available application update, a first set of application updates to be downloaded using the metered data network or an unmetered data network and a second set of application updates to be downloaded using only the unmetered data network;

responsive to determining that the respective amount of data required to download a particular application update exceeds the sliding window application update data budget or the daily application update data budget:

determine whether fewer than a threshold number of days remain in a data plan billing period;

responsive to determining that fewer than the threshold number of days remain in the data plan billing period, determine whether the respective amount of data required to download the particular application update is less than a total amount of unused data in the data plan billing period; and responsive to determining that the respective amount of data required to download the particular application update is less than the total amount of unused data in the data plan billing period, include the particular application update in the first set of application updates; and responsive to determining that the computing device is connected to the metered data network, send, to the computing device, the first set of application updates.

17. The non-transitory computer-readable storage medium of claim 16, wherein the instructions cause the one or more processors to schedule the first set of application update and the second set of application updates by at least causing the one or more processors to:

determine, based on the respective amount of data required to download each of the available application updates, whether each application update from the set of available application updates is downloadable using a metered data network without exceeding the sliding window application update data budget;

determine, based on the respective amount of data required to download each of the available application updates, whether any data budget from the daily application update data budget remains after downloading any other updates scheduled to be downloaded on a particular day;

responsive to determining that either the sliding window application update data budget would be exceeded for a particular application update from the set of available application updates or that there is no remaining data budget from the daily application update data budget, include the particular application update in the second set of application updates; and responsive to determining that the sliding window application update data would not be exceeded for the particular application update and that there is remaining data budget from the application update data budget, include the particular application update in the first set of application updates.

18. The non-transitory computer-readable storage medium of claim 16, wherein the instructions further cause the one or more processors to:

determine a respective application update priority score for each application included in the set of available updates based on one or more of a corresponding application update type, a corresponding application update history, a corresponding application category, corresponding application usage information, and a corresponding application update age;

order, based on the respective application update priority scores, the set of available application updates;

schedule the first set of application updates and the second set of application updates based on the ordering of the set of available application updates; and download the first set of application updates by at least downloading each application update included in the first set of application updates according to the ordering of the set of available application updates.

\* \* \* \* \*